J. M. GREEN.
Potato-Digger.
No. 66,704. Patented July 16, 1867.
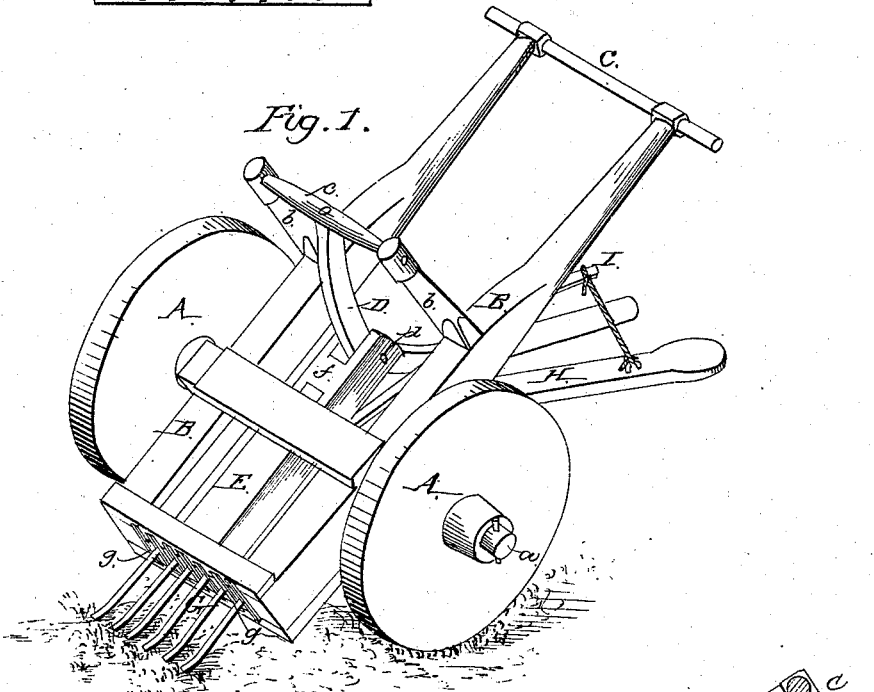
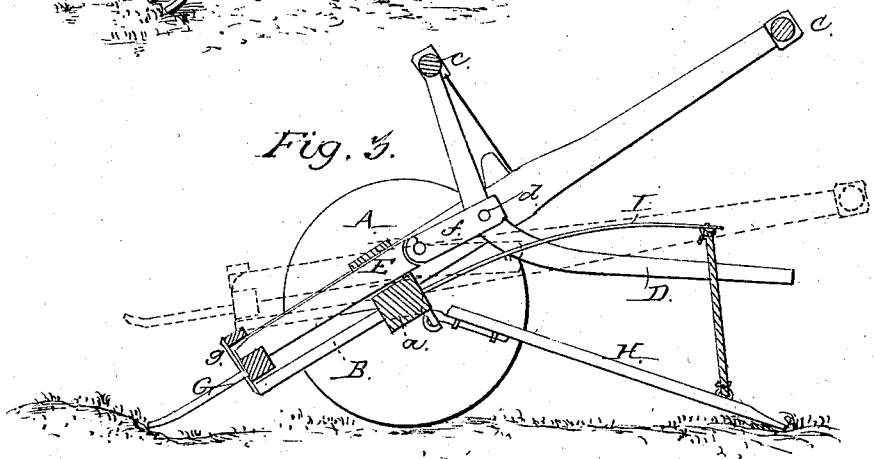
Witnesses:
R. F. Osgood
J. A. Davis
Inventor:
J. M. Green
By J. Fraser & Co
Attys.

United States Patent Office.

J. M. GREEN, OF WEST BLOOMFIELD, NEW YORK.

Letters Patent No. 66,704, dated July 16, 1867.

POTATO-DIGGER.

*The Schedule referred to in these Letters Patent and making part of the same.*

TO ALL WHOM IT MAY CONCERN:

Be it known that I, J. M. GREEN, of West Bloomfield, in the county of Ontario, and State of New York, have invented a certain new and useful improvement in Hand Potato-Diggers; and I do hereby declare that the following is a full and exact description thereof, reference being had to the accompanying drawings, making part of this specification.

Figure 1 is a perspective view of my improved machine.

Figure 2, a longitudinal vertical section.

Figure 3, a view of the bars through which the fork runs.

Like letters of reference indicate corresponding parts in all the figures.

My invention consists in a self-clearing fork mounted in a frame on wheels, which is run backward by hand over the row, the fork being made to protrude and retract by a suitable lever, and the frame and wheels being made to act as the lever and fulcrum to throw the potatoes out when the fork is inserted under them, and said wheels and frame being retained in place by a suitable spring tread-arm.

As represented in the drawings, A A are wheels supporting a frame, B, which extends back some distance, and has a cross-handle, C, by which the machine is operated. From the frame, back of the axle $a$, rise standards $b\ b$, having a rock-shaft, $c$. To the rock-shaft is secured a lever, D, extending back to the cross-handle. To the lever is jointed at $d$ a toggle, $f$, which is jointed in a similar manner at the opposite end to the shank E of the fork G, which runs under the hills. The shank and fork are so situated and guided longitudinally in the frame that they slide endwise in passing under the hill. The front end of the frame B is provided with a series of vertical bars or slats, $g\ g$, between which the tines of the fork pass in moving out and in. To the rear of the axle is jointed a tread-arm, H, extending back a suitable distance, and connecting with a spring, I, of any desired form.

The machine thus arranged is drawn back over the row. At each hill the operator bears his foot upon the tread-arm H, which then rests upon the ground and serves to hold the machine against backward force. He then drives the fork G under the hill by the lever D. When this is accomplished, he uses the frame itself as a lever, and the wheels as a fulcrum, and throws up the hill, as indicated by red lines in fig. 2. During all this action the machine is held steadily by the resistance of the tread-arm H. When the hill is thrown up, the fork is retracted or drawn back within its case, in doing which the bars $g\ g$ that alternate with the tines of the fork serve as a screen or rake to throw off the contents of the fork, so that nothing can be drawn back within the case. When the hill is thrown up the tread-arm is released and is drawn up by the spring, and the machine is free to move to the next hill.

Horse machines are found objectionable for the reason that they cover up a large portion of the potatoes, are arbitrary in their action, and are also very expensive. Ordinary hand-diggers consist simply of a fork with a tread-piece to hold it in place. The labor with such devices is very severe, owing to the great power required to be expended, and the stooping posture necessary to hold the device. I obviate all difficulties of this kind. While I render my machine as perfectly controllable by hand and as subservient to will as the ordinary fork, I at the same time combine the advantages of wheels, so that it is not only easily moved from one hill to another, but the wheels also serve as the fulcrum for the leverage.

The self-clearing bars $g\ g$ are features of much importance, since the fork thus invariably clears itself without difficulty, and with simply the back stroke of the lever D. The tread-arm H also serves an important purpose in holding the machine steadily in place. These features I believe to be original with myself.

What I claim as my invention, and desire to secure by Letters Patent, is—

1. The hand potato-digger, consisting of the sliding and self-clearing fork, G, lever D, main frame B, wheels A, and spring tread-arm H, the whole arranged, combined, and operating in the manner and for the purpose specified.

2. The special combination and arrangement of the clearing-bars $g\ g$ with the sliding-fork G in potato-diggers, as herein described.

3. The combination of the spring tread-arm H with the hand wheel potato-digger A B, operating as and for the purpose herein specified.

In witness whereof I have hereunto signed my name in the presence of two subscribing witnesses.

J. M. GREEN.

Witnesses:
MYRON S. HALL,
MATTHEW J. PECK.